United States Patent
Singh et al.

(10) Patent No.: US 6,415,396 B1
(45) Date of Patent: Jul. 2, 2002

(54) AUTOMATIC GENERATION AND MAINTENANCE OF REGRESSION TEST CASES FROM REQUIREMENTS

(75) Inventors: Kanwalinder Singh, Freehold; James J. Striegel, Little Silver; Polly Yu, Ocean, all of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/277,667

(22) Filed: Mar. 26, 1999

Related U.S. Application Data

(63) Continuation-in-part of application No. 09/277,287, filed on Mar. 26, 1999.

(51) Int. Cl.[7] .................................. G06F 11/00
(52) U.S. Cl. ..................... 714/38; 714/25; 714/33; 714/37
(58) Field of Search ................. 714/38, 37, 30, 714/33, 48, 741, 738, 25; 710/316; 340/825.06; 370/351, 241; 235/380

(56) References Cited

U.S. PATENT DOCUMENTS

| | | | |
|---|---|---|---|
| 5,522,036 A | * | 5/1996 | Shapiro |
| 5,694,540 A | * | 12/1997 | Humelsine et al. |
| 5,926,622 A | * | 7/1999 | Hardin et al. |
| 6,182,258 B1 | * | 1/2001 | Hollander |

* cited by examiner

Primary Examiner—Gopal C. Ray
(74) Attorney, Agent, or Firm—Hitt, Gaines & Boisbrun

(57) ABSTRACT

An apparatus and method for generating and maintaining a regression test case set directly and automatically from requirements models. A user operating the invention generates a representation of a system which captures temporal, functional, life cycle or other relationships between requirements. These relationships specify the circumstances under which a requirement applies and places the requirement in the context of other requirements. Selection techniques applied to the representation generates test cases. A regression test case set is a set of test cases that are used by the user to verify functionality in view of modifications or additions to the system. As the features of the system are adjusted over the life cycle of the system, the method of the invention automatically provides a regression test case set that affords optical coverage with respect to all features of the system. Any regression test cases that fail are automatically detected and graphically displayed. An interface is provided to specify how the failed regression test case should be resolved. The resulting regression test case set reflects all modifications to the system.

29 Claims, 7 Drawing Sheets

AUTOMATIC GENERATION AND MAINTENANCE OF REGRESSION TEST CASES FROM REQUIREMENTS

RELATED APPLICATIONS

The present patent application is continuation in part of U.S. patent application Ser. No. 09/277,287, entitled "Temporal-Behavioral Model Based Requirements Linkage," by inventors Kanwalinder Singh, James J. Striegel, and Polly Yu, having a filing date of Mar. 26, 1999, and having a common assignee related to U.S. patent application Ser. No. 09/283,937, entitled "Method and System for Extracting Process Descriptions from Message Flows," by inventor Gerard J. Holzmann, having a filing date of Apr. 1, 1999, and having a common assignee; to U.S. patent application Ser. No. 09/277,489, entitled "Automatic Generation of Test Cases from Requirements," by inventors Gerard J. Holzmann, David Lee, Margaret H. Smith, Mihalis Yannakakis, having a filing date of Mar. 26, 1999, and having a common assignee; to U.S. patent application Ser. No. 09/277,288, entitled "Test Harness Generation Utilizing Property Extraction for Stimulating an Event Driven Model," by inventors Kanwalinder Singh, James J. Striegel, and Polly Yu, having a filing date of Mar. 26, 1999, and having a common assignee; to U.S. patent application Ser. No. 09/277,287, entitled to U.S. patent application Ser. No. 08/559,325, entitled "Message Sequence Chart Analyzer," by inventors Gerard J. Holzmann and Doron A. Peled, having a filing date of Nov. 16, 1995, and having a common assignee. This patent application hereby incorporates by reference the above-referenced patent applications.

FIELD OF THE INVENTION

The invention relates generally to system design and more specifically to the automatic generation and maintenance of regression test cases in requirements engineering.

BACKGROUND

Requirements engineering is commonly performed in one form or another as part of the process of building large software systems. The required or anticipated behavior of the new software is typically described in a textual requirements document prepared in written prose. Many of the documented requirements describe the expected behavior of a system component in response to a particular sequence of external stimuli.

Due to system complexity and the limits of written text, descriptions of the component behavior are often ambiguous and incomplete. Capturing complicated branching scenarios accurately in a written requirements document is a difficult, detailed task that is often unmanageable. The included descriptions are predominantly the so-called sunny day scenarios, with little coverage of failure or error scenarios. Exceptions to the sunny day scenarios are left as an exercise for the developers, who have to implement the system in conformance with the requirements. These exceptions, however, typically usurp a large part of the development effort and ultimately determine the quality and reliability of the final design.

Message sequence charts (MSCs)—also known as time sequence diagrams, message flow diagrams, or object interaction diagrams—are a popular visual formalism for documenting design requirements for concurrent systems. MSCs are often used in the first attempts to formalize design requirements for a new system and the protocols it supports. MSCs can be used to represent typical execution scenarios, providing examples of either normal (sunny day) or exceptional (rainy day) executions of the proposed system. Although an MSC is useful for depicting time-sequence interactions between processes, conditional branching is not represented in an MSC.

The scant coverage of exceptions in requirements documents and the ambiguous nature of textual requirements also inhibits the acceptance testing phase of system implementation. Prior to implementing a system, test cases are typically generated by manually translating textual requirements directly into a test script, or by manually translating textual requirements to a test model. Tests are automatically generated from the test model. Test cases are ordered sets of inputs and descriptions of expected responses for the system under test. When test cases are generated directly from the requirements document, the quality and completeness of the test cases is subject to the test engineer's ability to devise scenarios which will test the requirements of interest. If test cases are generated from a test model, there is no automated means of verifying that the test model conforms to the requirements. Tests generated from such a test model rarely conform to the requirements, since the test model contains the misjudgments, interpretations and errors introduced by the test engineer during the translation from requirements to test model.

Another disadvantage of the manual construction of a test model from a requirements document is the time and effort required. The test engineer must learn about the features or capabilities described by the requirements document (a topic already well understood by the author of that document), manually construct the test model, then make whatever checks are possible (and these will be limited, given the absence of automated tools to assist with this task) to ascertain that the test model is consistent with the intent of the requirements document.

The above problems are amplified once the system has been implemented. New features are typically requested and added as users exercise the functionality of the system. New test cases are created as the new features are added. Sets of test cases are, therefore, maintained for a system to ensure that previous functionality still works, that new functionality works and that the new functionality does not adversely affect the old functionality. These test case sets are termed regression test cases, and the activity of testing a system to ensure conformance with legacy requirements is typically termed regression testing.

Regression test case sets are created and maintained manually over the life of the system. They are manually selected based on the number of tests that can be run in an allotted amount of time, tests that exercise the most important features of the system, and tests that have historically exposed the greatest number of problems in the system when introducing new features. A drawback of prior art regression testing is that some of the additional test cases repeat test actions that are covered by other test cases in the regression test case set. This is the penalty associated with incremental addition of test cases. For a large, complex project, using the manual iterative method of adding test cases to the regression test case set can result in a large amount of duplicate test actions.

Without the ability to automatically regenerate the test set in response to changes made to the requirements, the testing effort proceeds inefficiently. Initially, it is possible to manually select a close to optimal set of test cases from a small requirements model. The requirements model, however, grows as new features and capabilities are added to the system. Once the requirement model is large, manually selecting a close to optimal set of test cases is impossible. In one known method, the original set of test cases will simply be augmented with test cases that exercise the new parts of the requirements model. Over time, using this approach, there will be extensive redundancy between the test cases. The same scenarios or scenario fragments are included in a large proportion of the test cases. Other scenarios and scenario fragments will be ignored entirely and will not be included in any test case. Overall there will be a large number of test cases, far more than necessary for coverage, and the coverage achieved by this large test set will be poor.

There are no tools available to aid in the automatic generation of regression test cases from textual requirements. There is a small set of tools that provide automatic generation of test cases from test models. However, each of these tools suffer from the same shortcoming; they require the separate and distinct task of manually constructing a test model based on a reading and interpretation of a textual requirements document. One such approach and its associated tools, Tree and Tabular Combined Notation (TTCN), is an international standard which employs conditional branching and allows generation of TTCN tests from the TTCN test specifications. Generation of TTCN tests from stand-alone MSCs (non-branching MSCs) has also been demonstrated. It is also known to automatically generate test cases from extended finite state machines (EFSM) that are created by a user operating a graphical user interface (GUI). Again, these tools are limited because they require the user to first manually construct a test model from the requirements document.

SUMMARY OF THE INVENTION

The invention generates regression test case sets directly and automatically from behavioral-requirements models, and automatically regenerates regression tests or repairs existing regression tests when the model is modified. A regression test case set is a set of test cases that are applied by the user to verify functionality in view of modifications or additions to the system. In the process of documenting the requirements, a user creates a behavioral-requirements model, which is a model of a system containing temporal, functional, life cycle or other requirements relationships. These relationships specify the circumstances under which a requirement applies and places the requirement in the context of other requirements. The model, also referred to as the representation, is in the form of a hierarchical graph. Selection techniques are applied to the graph to generate test cases. The selection techniques are chosen to produce the optimal set of test cases. In the field of regression testing, where the number of tests that can be performed is limited by schedule constraints and access to testing lab equipment, the optimal set of test cases is that set which provides coverage of the graph and is minimal with respect to the number of tests and test length. Changes to the requirements that break test cases (i.e. breaks a path through the graph) in the previously generated regression test case set are detected automatically.

In an exemplary embodiment of the invention, a representation of a distinct and bounded feature of a system, called a behavioral-requirements model, is constructed from requirements. The invention automatically generates test cases using the information available in the model and establishes a regression test case set. As the features of the system are adjusted over the life cycle of the system, the invention automatically provides a regression test case set that offers optimal coverage with respect to the old and adjusted features of the system. The resulting regression test case set correctly reflects all changes in the modified system. Any regression test cases that fail are graphically displayed together with instructions as to how the failed regression test case should be resolved.

BRIEF DESCRIPTION OF THE FIGURES

For a better understanding of the invention, reference may be had to the following description of exemplary embodiments thereof, considered in conjunction with the accompanying drawings, in which.

DETAILED DESCRIPTION OF THE FIGURES

This invention automatically generates and maintains test cases from a body of requirements. To better understand the invention, the description initially presents an overview of requirements, requirement relationships, Message Sequence Charts ("MSC"), scenarios and behavioral-requirements models. Next, the architecture of an exemplary system is described. The architecture includes a Behavioral-requirements model editor, which is further described in the Behavioral-requirements model editor section. Following the description of an exemplary architecture and the Behavioral-requirements Model Editor, the construction of a directed graph representation of a behavioral-requirements model is demonstrated. The next section explains the automatic generation of test cases from a directed graph representation and the establishment of a regression test case set. The description then details how the regression test case set is maintained with respect to modified or additional features in the system.

Overview of Concepts

A requirement is a distinct and bounded property which a system component must fulfill, such as the way in which a dispenser must dispense cash in an automatic teller machine system. The circumstances and context under which a requirement applies specifies a requirement relationship. These relationships can be temporal relationships, where a given requirement is executed, a new event is received and then a second requirement is executed. They can be functional, where requirements are grouped based upon the system component that is assigned to fulfill the requirement. They can also be cyclical, where requirements are grouped by the phase of the component in which they are to be implemented. Models which capture requirements and the relationships between requirements are known as requirements models.

Figure 1:
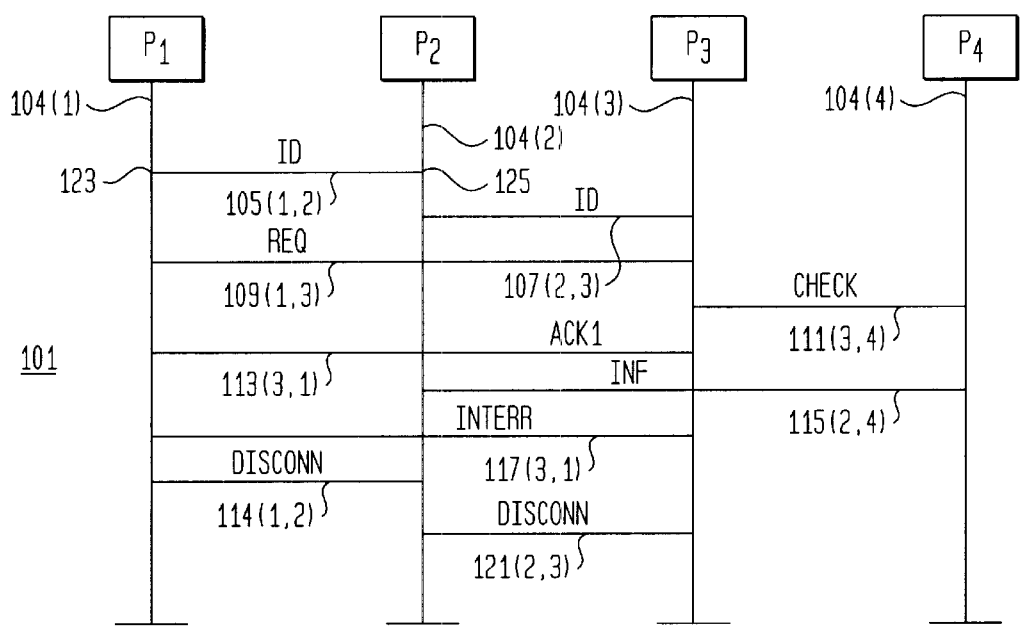
FIG. 1 shows an exemplary message sequence chart.

Message sequence charts (MSCs) are a formalism of design requirements for concurrent systems. FIG. 1 shows a typical message sequence chart 101 of a system made up of four concurrently-operating components $p_1$ through $p_4$. Each of the components is represented in the chart by a vertical line 104. 104(1) represents $p_1$, 104(2) represents $p_2$ and so forth. The processes of message sequence chart 101 coordinate their operations by means of messages. Each message is represented by an arrow, for example, arrow 105. Arrow 105 represents a message of the Id type which is sent from process $p_1$ to process $p_2$. Source and destination are indicated in FIG. 1 by the tail and head of the arrow and in the reference number for the message by the pair of numbers in parentheses following the reference number. For the present discussion, the types of the messages are not important; it is sufficient merely that processes $p_1$ through $p_4$ interact with each other by means of messages 105 through 121.

When a message is sent, a send event occurs, and when it is received, a receive event occurs. A send event is indicated in the MSC by the point at which the arrow represented by the message leaves the sending process and a receive event is indicated by the point at which the arrow represented by the message strikes the receiving process. In FIG. 1, a send event is shown at 123 and a receive event at 125. Logical and temporal relationships between an MSC's events can be expressed by means of event pairs. For example, event 123 is the causal predecessor of event 125, and that relationship can be expressed by the event pair (123,125).

MSCs are often used in the first attempts to formalize design requirements for a new system and the protocols it supports. MSCs can be used to represent typical execution scenarios, providing examples of either normal (sunny days) or exceptional executions (rainy day scenarios) of the proposed system, although not contemporaneously in the same MSC. An ITU standard, ITU Z.120, exists for MSCs and for a standard textual form of the MSC. Originally, MSCs were made with pencil and paper; now, many engineers use drawing programs executing on desk top computers to make MSCs. In such cases, the drawing program makes a file which contains information used to reconstruct the image of the MSC.

Although an MSC is a useful formalism for capturing message flow, an MSC is limited to a single scenario. A behavioral-requirements model, on the other hand, represents a distinct and bounded feature of a system, including exceptions. A particular behavioral-requirements model may contain a sunny day path, but it is also capable of contemporaneously representing exceptions, or rainy day paths. For instance, in an automatic teller system, a behavioral-requirements model of interest might be "withdrawal." For the withdrawal feature of an automatic teller machine, the sunny day path is the case where the amount of money requested is less than the balance available for withdrawal. One possible exception to the sunny day path occurs where the amount of money requested exceeds the account balance. Another exception occurs where the amount of money requested exceeds the dollar amount stored in the machine. A third exception might occur where the requester is not entitled to withdraw money from the referenced account (invalid PIN).

The various behavioral descriptions, expected or exceptional, of a system feature are referred to as scenarios. A scenario defines a non-branching thread or path through a system feature. A behavioral-requirements model, unlike an MSC, represents multiple scenarios, and preferably all the scenarios, of a system feature. If a behavioral-requirements model has conditional branching, then there will be more than one possible scenario in the behavioral-requirements model. The sunny day path, which shows the expected behavior of a system feature, is one scenario. The paths through the system that define exceptions are also scenarios.

Figure 2A:
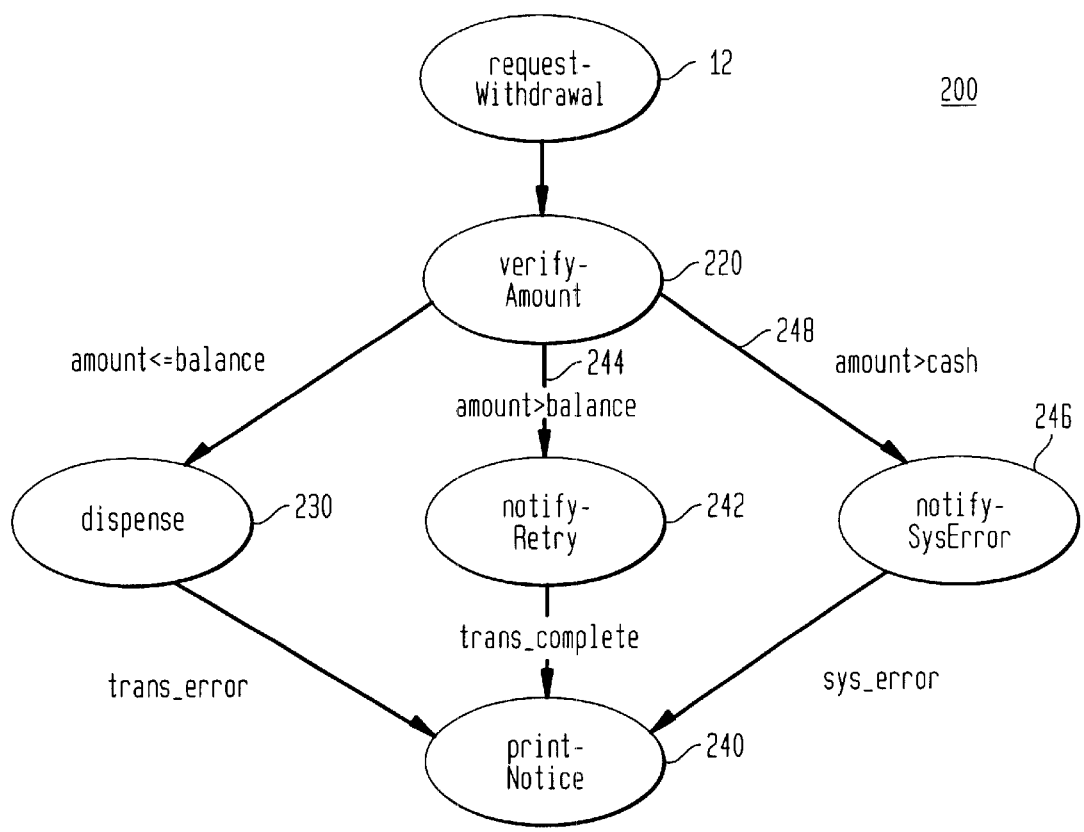
FIG. 2A shows an exemplary directed graph for a behavioral-requirements model according to the principles of the invention.

In one exemplary embodiment of the invention, behavioral-requirements models are described with directed graphs. A sample directed graph 200 for a behavioral-requirements model called "Request Withdrawal" is shown in FIG. 2A. Oval shapes represent nodes and arrows linking nodes are called edges. A node or oval shape can identify (or point to) a MSC or a behavioral-requirements model, or it can be empty. Underlying behavioral-requirements models are called sub-behavioral-requirements models or, if depicted as a directed graph, a subgraph. Where two or more arrows emanate from a node, a conditional branch occurs, representing an additional path or scenario through the behavioral-requirements model. Unlike an MSC, a behavioral-requirements model depicted as a directed graph captures requirements and requirement relationships, and places requirements in context with other requirements.

Figure 2B:
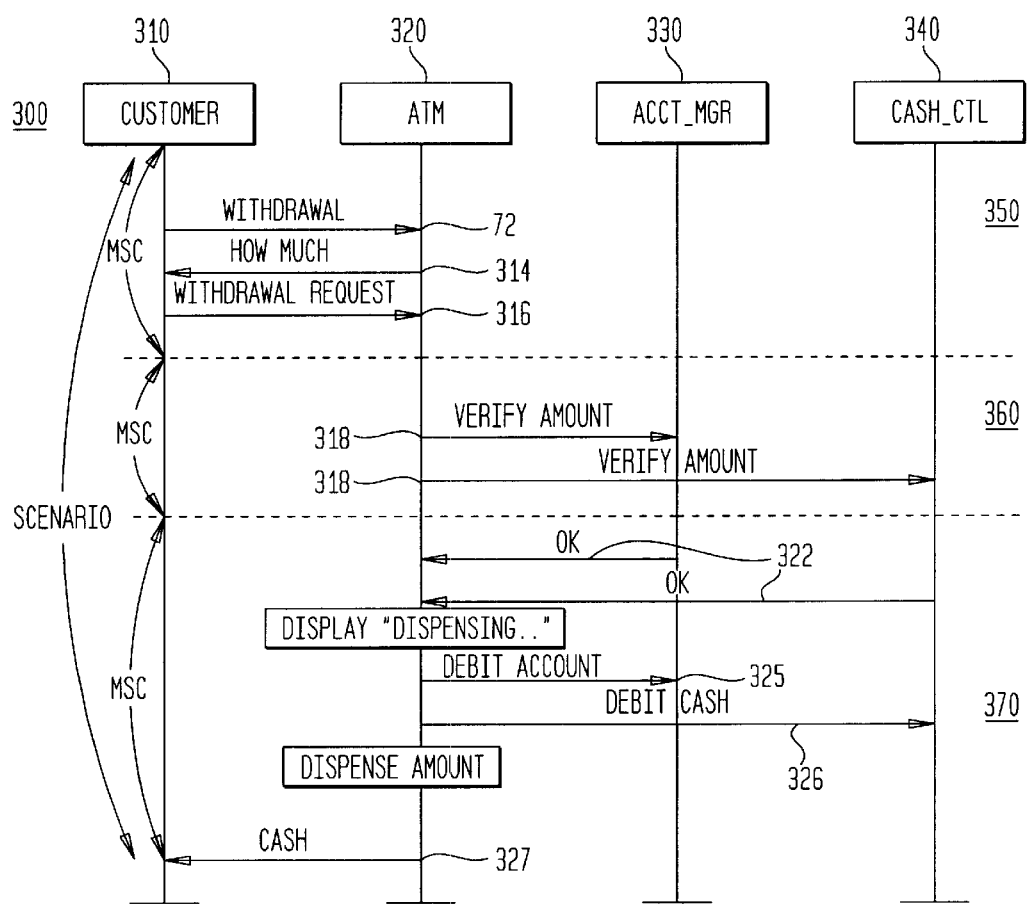
FIG. 2B shows an exemplary message sequence chart.

The relationship between behavioral-requirements models, scenarios and MSCs are graphically depicted in FIG. 2A and FIG. 2B. For simplicity, the figures graphically represent relationships for a sample behavioral-requirements model, the "Request Withdrawal" feature of an automatic teller machine system (ATM). FIG. 2A is a directed graph 200 of the behavioral-requirements model and it depicts three possible scenarios. The sunny day scenario consists of the nodes and edges defining the path through nodes "request withdrawal" 12, "verify amount" 220, "dispense" 230, and "print notice" 240. This scenario is the sunny day scenario, because it represents the expected behavior of the system—a withdrawal request is made by an appropriate user and the resources are present to honor the request. The system dispenses cash and prints a notice. The two remaining scenarios capture the system requirements where cash will not be dispensed.

The relationship between the directed graph 200 of FIG. 2A and an MSC 300 is explained with reference to FIG. 2B. The extended MSC 300 for the sunny day scenario is shown, except for properties associated with the node "print notice" 240. The extended MSC 300 depicts the behavior of four processes: Customer 310, ATM 320, Acct_Mgr 330 and Cash_Ctl 340. The MSC 300 is divided into three MSC fragments 350, 360, 370; where the "request withdrawal" node 12 corresponds to the first MSC fragment 350, the "verify amount" node 220 corresponds to the second MSC fragment 360 and the "dispense" node 230 corresponds to the third MSC fragment 370. Each node captures the behavior formalized in its corresponding MSC fragment.

For example, in the first MSC fragment 350, defined by node "request withdrawal" 12, Customer 310 sends a "withdrawal" message 72 which is received by ATM 320. The message "how much" 314 is then sent by ATM 320 to Customer 310. Once Customer 310 receives the message "how much" 314, it sends the message "withdrawal request" 316 to ATM 320. In the second MSC fragment 360, corresponding to node "verify amount" 220, ATM 320 sends the message "verify Amount" 318 which is received by Acct_Mgr 330 and by Cash_Ctl 340. In the third MSC fragment 370, corresponding to the "dispense" node 230, Acct_Mgr 330 and Cash_Ctl 340 send a message "ok" 322 to ATM 320 signaling that the requested amount is less than the account balance and the cash resources. This fragment 370 also depicts ATM 320 receiving the message "ok" 322 from Acct_Mgr 330 and "ok" 322 from Cash_Ctl 340. ATM 320 then sends the messages "debit account" 325 to Acct Mgr 330 and "debit cash" 326 to Cash_Ctl 340. The ATM 320 also sends cash 327 to Customer 310.

As can be seen, the nodes and edges of the directed graph 200 capture all the behavior of the extended MSC 300; that is, the sunny day scenario. Unlike an MSC, however, the directed graph 200 also captures exceptional behavior. In one scenario, the node "verify amount" 220 is linked to node "notify Retry" 242 by edge "amount>balance" 244. In this scenario, the amount requested exceeds the amount available for withdrawal from the account. Instead of dispensing cash, the ATM 320 is required to send a "retry" notice to the customer. In a third scenario, the cash reserves of the ATM 320 are less than the amount requested, and an out-of-order status message should be displayed on the ATM interface. This requirement is represented in node "notify Sys Error" 246 which is linked to "verify amount" 220 by edge "amount>cash" 248. The behavior requirements of the system components differ for each scenario of the behavioral-requirements model, and extended MSCs for these scenarios (not shown) are different than for the sunny day scenario.

The resulting model is a behavioral-requirements model, where the MSCs referenced by the directed graph capture the temporal requirements of the system. Those may be, for example, requirements describing communication between components and when they occur, the content of messages, and how a message is constructed and how the receiving component reacts to the message. The basic MSCs referenced in the directed graph specify the relationships between these requirements in terms of their causal relationships; therefore, the model is also a temporal model.

Architecture of an Exemplary System

Figure 3:
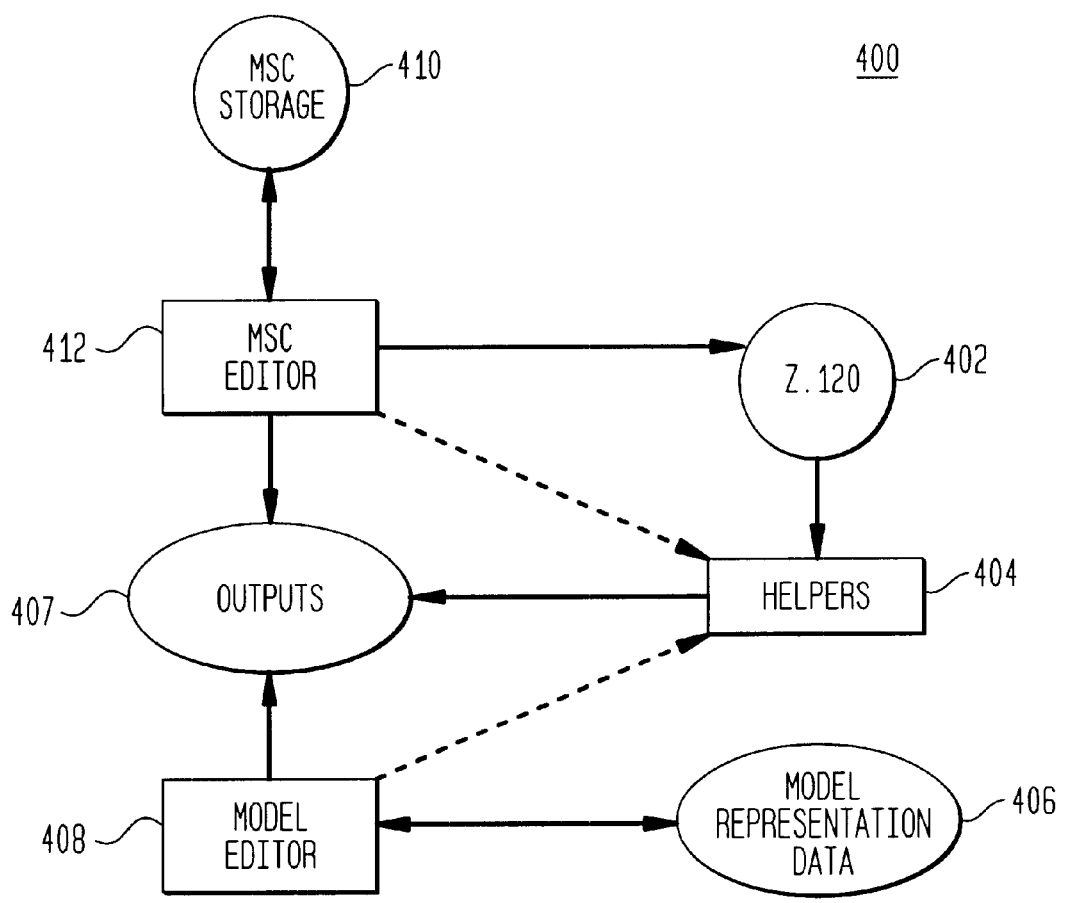
FIG. 3 shows the architecture of an exemplary system according to the principles of the invention.

The diagram of FIG. 3 shows the architecture of an exemplary system 400 according to the invention. The system, implemented on a computer workstation, generates MSC and behavioral-requirements model representations. Executables or sets of functionally similar executables which comprise an MSC editor 412, a Behavioral-requirements model editor 408, and Helpers 404 are shown as boxes, and files used or generated by the executables are shown as ovals. The files include MSC storage 410, which are nonstandard MSC representations; Z.120 402, which are files according to the ITU standard for MSC representations; behavioral-requirements model representation data 406; and outputs 407, which are output files for, among other things, use by the MSC editor 412 and the Behavioral-requirements model editor 408. Solid lines depict standard file input/output and dash lines represent requests placed on Helpers 404 by either the MSC editor 412 or the Behavioral-requirements model editor 408.

An overview of an MSC editor 412 is provided in U.S. patent application Ser. No. 08/339,325, entitled Message Sequence Chart Analyzer, having a common assignee and incorporated herein by reference. Although the MSC editor described therein is compatible for use with this embodiment of the invention, it will be apparent to one skilled in the art that any editor responsive to user inputs and for providing an MSC representation, including an ITU standard representation, will suffice. The referenced MSC editor 412 is implemented using TCL/TK modules. In this aspect, a set of programs known as a Fire Wall (not shown) is provided to allow access to system resources that are not available to TCL/TK programs. In a preferred embodiment, the MSC editor 412 stores MSCs as per ITU Standard Z.120.

Regarding the other subsystems shown in FIG. 3., subsystem Helpers 404 is a family of executables which include helper applications MSC Parser, DOT, Euler Cover and GIFG. The MSC Parser, not shown, is a Yet Another Compiler Compiler (YACC) Parser, a standard UNIX tool (UNIX is a trademark of the XOPEN Foundation), which can be called by MSC editor 412 each time a new Z.120 402 file is read. The calling convention invokes MSC Parser with an argument specifying the location of the Z.120 402 file. The output of MSC Parser is a layout specification used by MSC editor 412 and GIFG. The file can be edited by MSC editor 412, and GIFG generates GIF (Graphics Interchange Format) files, as is known in the art, as one of the outputs 407 of MSC editor 412.

Helpers 404 application DOT is a known directed graph layout engine. Behavioral-requirements model editor 408, which is further described below, invokes this application to generate a graphical layout for directed graphs of behavioral-requirements models, including nodes and edges. For a detailed description of DOT, refer to E. R. Gansner, E. Koutsofios, S. C. North, and K-P. Vo, "A Technique for Drawing Directed Graphs," *IEEE Transactions on Software Engineering*, Vol. 19, No. 3, May 1993, pages 214 to 230. DOT is invoked by a request from Behavioral-requirements model editor 408 to Helpers 404.

GIFG (not shown) is an executable or family of executables and a part of Helpers 404. It is known in the art to store images as GIF files. MSC editor 412 and Behavioral-requirements model editor 408 may invoke GIFG for depicting an MSC or a behavioral-requirements model, including the directed graph representation of a behavioral-requirements model. In one embodiment, the GIF file is treated by the Behavioral-requirements model editor 408 and the MSC editor 412 as an output file.

In the exemplary embodiment, the behavioral-requirements model is a directed graph representation which is used to automatically generate an optimum number of scenarios for testing. Test scenarios are provided by invoking Euler Cover (not shown) from Helpers 404. A workstation applying the methods of Euler Cover finds a set of test paths through a directed graph starting at the initial node. The path set covers all the edges and has two properties: (1) the number of paths are minimized; and (2) the total length of the paths is minimized among all the sets that satisfy (1). As would be known to one of ordinary skill in the art, this problem is an extension of the Chinese Postman problem, which minimizes criterion (2). The specification of the Chinese Postman problem, Euler tours and minimum cost flows are set forth in J. Edmonds, E. L. Johnson, "Matching, Euler Tours and the Chinese Postman," *Mathematical Programming* 5 (1973), 88–124; J. Edmonds, R. M. Karp, "Theoretical Improvement In Algorithmic Efficiency For Network Flow Problems," *J. ACM* (1972), 248–264; and E. L. Lawler, "Combinatorial Optimization: Networks and Matroids," *Holt, Rinehart & Winston*, 1976.

In one embodiment, the selection process consists of constructing a network N from the directed graph of interest, G. The network N is constructed with capacities and costs on the edges (i.e., a "network"), and a minimum cost, maximum flow problem is defined on this network. N is constructed by adding a new source node s and a new sink node t to G. For each node of G, a deficit is computed by taking the difference between the number of arcs exiting the node and the number of arcs entering the node. Arcs are added in N from the source node s to all nodes with positive deficit, such that the capacity of each arc is set equal to the deficit of the node. The cost of each arc is set to 0. Arcs are also added from all nodes with negative deficit to the sink node t, such that the capacity of each arc is set equal to the absolute value of the deficit of the nodes. Again, the cost is set to 0. Arcs with infinite capacity and with cost set to a very large number are added from all nodes of G to the initial node of G. Finally, every arc of the original graph G is assigned infinite capacity and assigned a cost equal to 1. The minimum cost, maximum flow problem is solved on the constructed network N. This is a classical problem and solution methods are described in the above references.

The optimal solution to the flow problem is then used to add arcs to the original graph G, yielding an augmented graph G'. For each arc of N, excluding those incident to the source node s or the sink node t, a number of parallel arcs equal to the flow along the arc in N are added to G. In other words, if the flow solution indicates that a particular arc in N has a flow value of five, then five parallel arcs are added to the corresponding nodes in G to yield the augmented graph G'. An Euler path is constructed in the augmented graph G' starting from the initial node. The Euler path is broken down into test paths by removing the parallel copies of the very large cost arcs incident to the initial node that were previously added.

The Behavioral-requirements Model Editor

Figure 4:
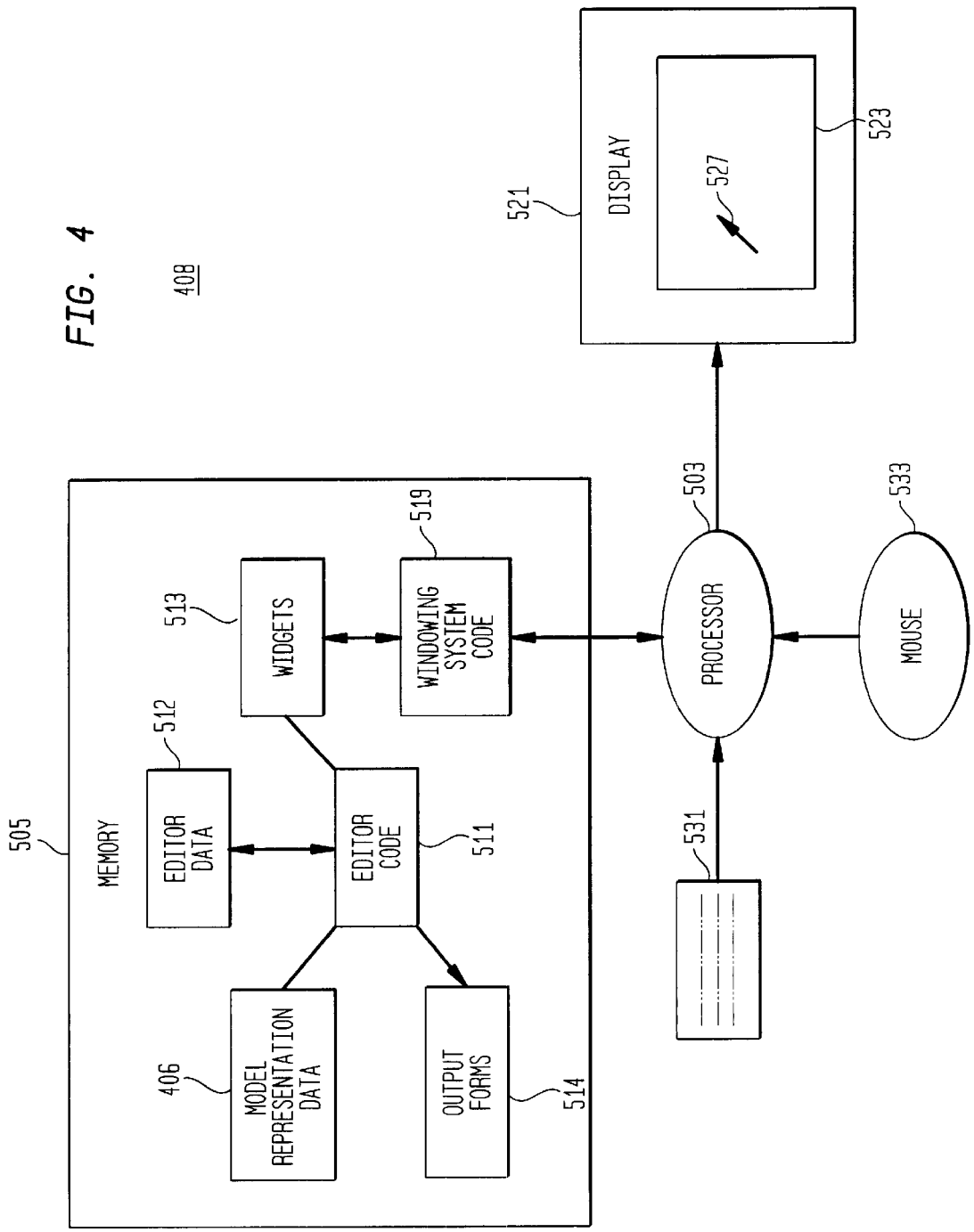
FIG. 4 shows an exemplary behavioral-requirements model editor.

The system architecture includes a Behavioral-requirements model editor 408, which will now be described in further detail. Referring to FIG. 4, the editor 408 is implemented as TCL/TK modules and may be implemented in a workstation which employs the UNIX® operating system (UNIX® is a trademark of the XOPEN Foundation) and the XWINDOWS system for controlling a graphical user interface (GUI). The workstation includes a processor 503, memory 505 (including storage media such as disk drives) accessible to the processor 503, and IO devices including a display device 521 with a window 523, a keyboard 531 and a mouse 533 which controls a pointer 527 in the window 523. Output devices such as printers or plotters may be connected to the processor 503 in addition to the display device 521, and other pointing devices such as styli may be employed instead of a mouse 533.

When the workstation is being employed as a behavioral-requirements model editor 408, memory 505 contains Behavioral-requirements model editor code 511 and windowing system code 519 and three sets of data structures: widgets 513, which are the data structures used by windowing system 519 to interact with Behavioral-requirements model editor code 511, Behavioral-requirements model representation data 406, and Behavioral-requirements model editor data 512, which contains data used by Behavioral-requirements model editor code 511 in interacting with Behavioral-requirements model representation data 406 and widgets 513. Depending on how the editor 408 is being used, memory 505 may also contain other forms of output 514 produced by Behavioral-requirements model editor code 511. In a preferred embodiment, these other forms of output include a text file which is a conventional ASCII annotated scenario for a behavioral-requirements model, a GIF file, as is known in the art, and a Postscript file for a behavioral-requirements model. Other embodiments may also include an output which is a representation of the behavioral-requirements model which can be used as input to a system verification program.

In the exemplary embodiment, the widgets are made using TCL and the TK tool kit. For details, see J. Ousterhout, *TCL and the TK Tool Kit*, Addison-Wesley, 1994. The arrows in memory 505 show the flow of data between the components; the data is moved by means of processor 503 operating under control of a program stored in memory. Similarly, the program code in memory 505 operates on data only when the program code is being executed by processor 503. For example, when it is stated that Behavioral-requirements model editor 408 produces a representation 406, what is meant is that Behavioral-requirements model editor being executed by processor 503 produces the representation 406.

If a representation 406 of a behavioral-requirements model already exists, Behavioral-requirements model editor 408 reads the representation 406 and sets value in widgets 513 such that window system code 519 displays the behavioral-requirements model represented by the representation 406 in window 523. The user can then manipulate the contents of window 523 with keyboard 531 or pointing device 533. The user inputs the keyboard 531 or pointer device 533 result in hardware interrupts to which windowing system code 519 responds by updating window 523 to reflect the input, by setting values in widgets 513 representing the affected components of window 523 and by invoking call-back functions in Behavioral-requirements model editor code 511 for those widgets whose values have changed.

The call-back function examines the changed values and if they indicate a change in the behavioral-requirements model displayed in window 523, Behavioral-requirements model editor code 511 alters Behavioral-requirements model editor data 512 to reflect the change. Behavioral-requirements model editor data 512 thus always indicates the current state of the behavioral-requirements model. As with other editors, the user can command Behavioral-requirements model editor 408 at any time to produce a representation 406, and Behavioral-requirements model editor code 511 will use the data in editor data 512 to produce a new representation which reflects the behavioral-requirements model as it exists when the representation is made. If the changed values of widgets require that the behavioral-requirements model be modified, Behavioral-requirements model editor code 511 sets values in widgets 513 as required to modify the behavioral-requirements model, and windowing system code 519 responds to those changes by changing the appearance of the behavioral-requirements model in window 523.

Constructing a Behavioral-requirements Model

The construction of a behavioral-requirements model will now be described. In an exemplary embodiment, the Behavioral-requirements model editor 408 constructs a directed graph. The operator constructs the graph from a written body of requirements or from some other requirements models or formalism, such as MSCs. For instance, consider the requirements for the ATM withdrawal request shown in FIG. 2B—the sunny day scenario. In the second MSC fragment 360, ATM 320 sends the message "verify amount" 318 to Acct_Mgr 330 and Cash_Ctl 340. After receiving the message, in the third MSC fragment 370, Acct_Mgr 330 and Cash_Ctl 340 send message "ok" 322 to ATM 320 and the cash withdrawal proceeds. This scenario fails to capture the exception where either Acct_Mgr 330 or Cash_Ctl 340 fail to send message "ok" 322.

Figure 5:
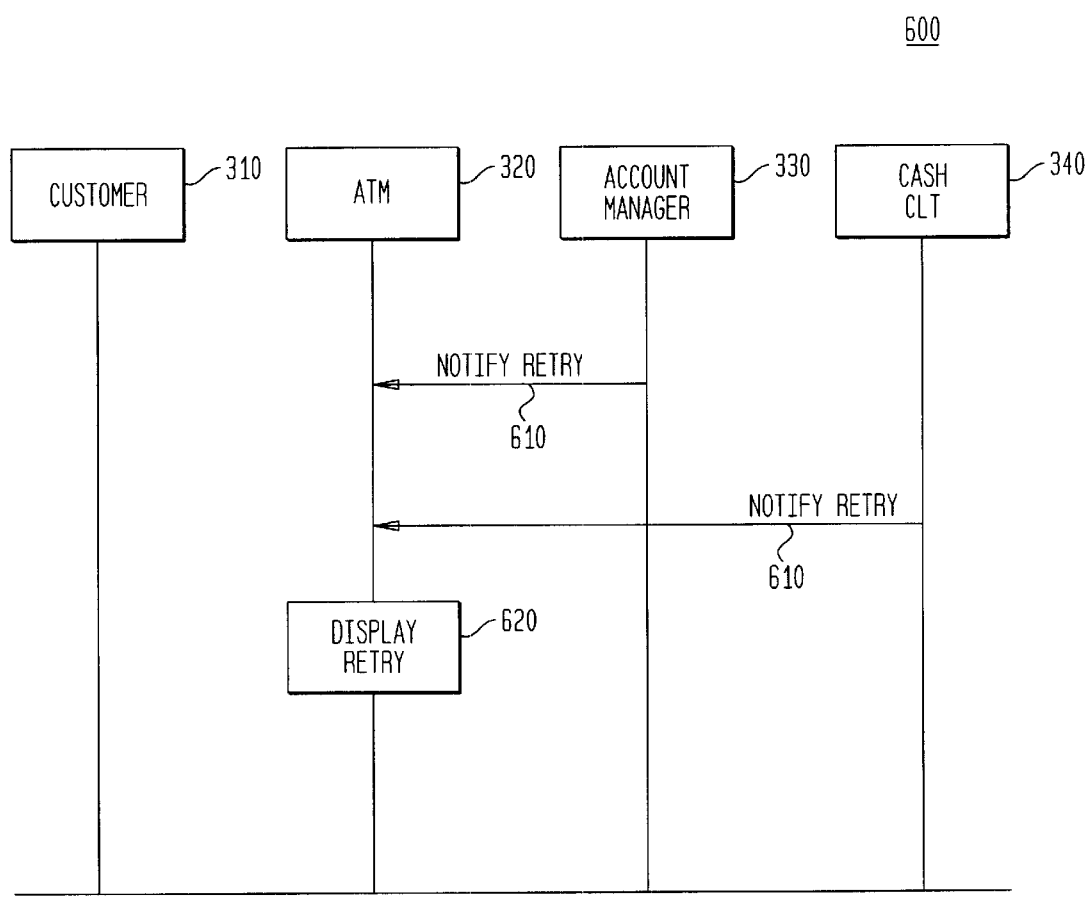
FIG. 5 shows an exemplary message sequence chart.

Using the Behavioral-requirements model editor 408, however, the system designer captures the alternative scenarios. Referring to FIG. 5, an MSC 600 is shown for the alternative scenario where the amount requested exceeds the balance. This MSC 600 may be constructed using MSC editor 412 or it may be already stored as an ITU Z.120 file or as some other representation. In this exceptional scenario, because the account balance is insufficient, Acct_Mgr. 330 sends the message "notify retry" 610 which is received by ATM 320. The same message is sent by Cash_Ctl 340. In accordance with the required behavior for this exception, ATM 320 displays "Retry" 620 on the ATM interface.

Referring to FIG. 2B, the Behavioral-requirements model editor 408 can be used to create the node "notify retry" 242 and to join node "verify amount" 220 with "notify retry" 242 by means of an edge. The MSC fragment depicting this portion of the scenario is linked to the node "notify retry" 242 by an alphanumeric identifier, although other means for associating an MSC with a node would be apparent to one of ordinary skill in the art. Similarly, the Behavioral-requirements model editor 408 allows the user to capture the third scenario by creating the node "notify sys err" 246 and joining that node to "verify amount" 220 by means of an edge 248. The resulting directed graph 200 representation captures all the behavioral requirements of the Request Withdrawal system feature, including rainy day and sunny day scenarios.

Figure 6:
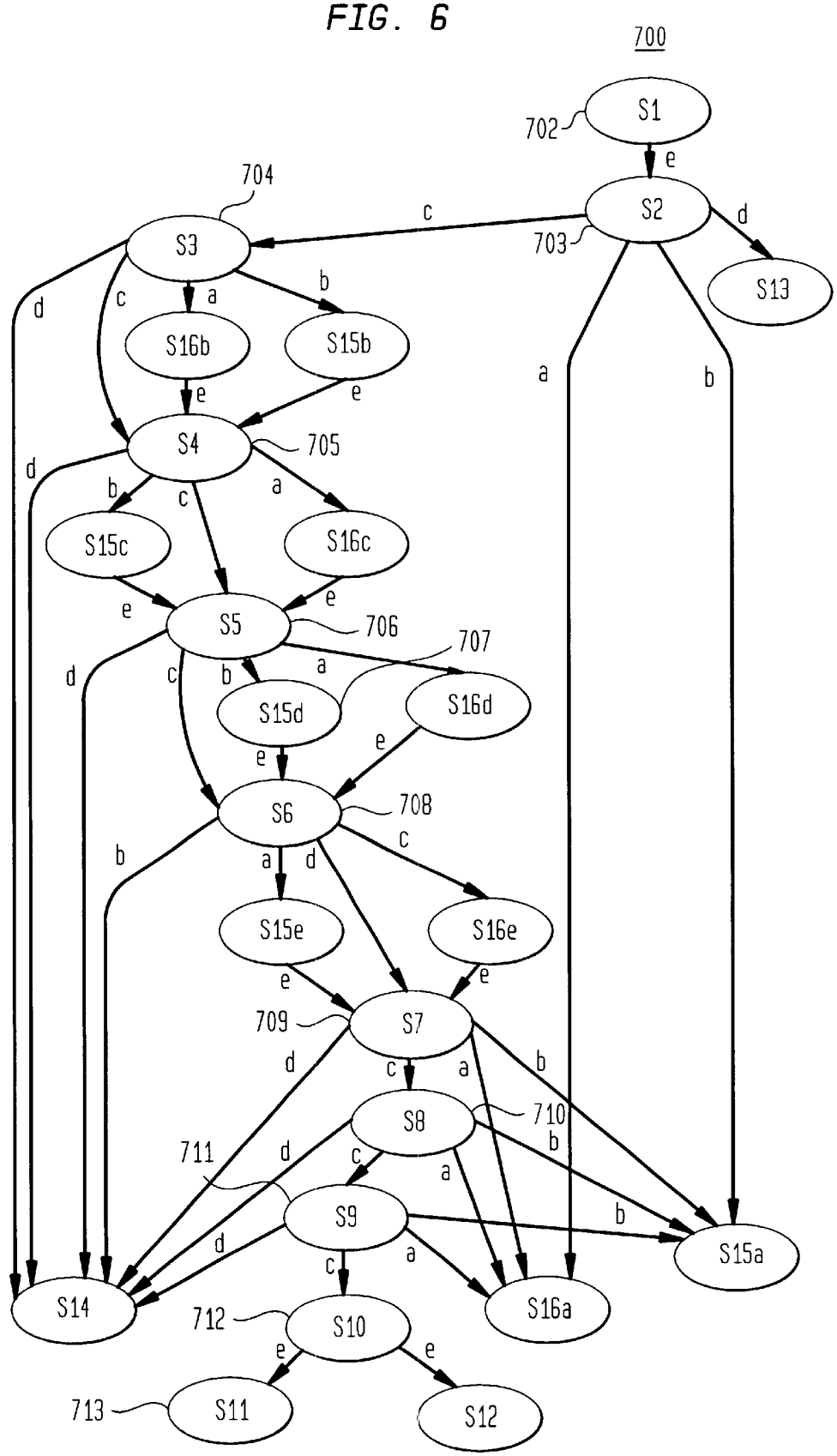
FIG. 6 illustrates a directed graph of a hypothetical system.

Similar manipulation with the Behavioral-requirements model editor 408 is used to represent systems of higher complexity. Referring now to FIG. 6, a directed graph 700 of a hypothetical system with higher level complexity is shown. As in the previously discussed conventions, each node, which reference either a sub-behavioral-requirements model, a MSC, or is empty, are shown as ovals. Each edge, which link nodes, are shown as arrows. The nodes 702–713 and the edges linking them represent one path through the directed graph 700. This graph 700 can be constructed from a written body of requirements, from preexisting MSCs, from preexisting behavioral-requirements models or from any combination of the three. Unlike the simple system depicted in FIG. 2B, there are multiple complex scenarios for this hypothetical system. And unlike the simple system of FIG. 2A and FIG. 2B, there is no clear set of paths through the directed graph 700 which will touch each edge in the graph 700.

Generating Test Cases and Regression Test Case Sets

The application of Euler Cover to a directed graph representation automatically generates a substantially minimum set of paths which encompass all the requirements of a particular behavioral-requirements model. The Behavioral-requirements model editor 408 invokes Euler Cover in Helpers 404, which is responsive to a directed graph representation, to determine a set of paths through the graph. Where a node represents a subgraph, the subgraph is inlined into the directed graph describing the behavioral-requirements model of interest. Inlining, or flattening, removes the hierarchical structure of the graph so that all paths of interest are captured in a single dimension. The selection process finds a set of paths through the graph that covers an optimum set of edges, as previously explained.

Figure 7A:
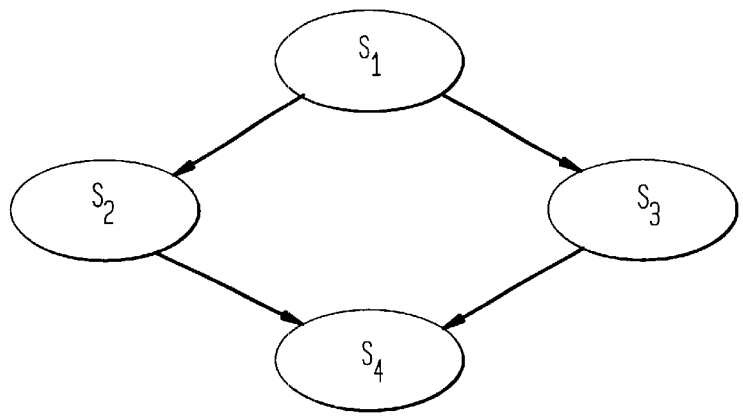
FIG. 7A illustrates a directed graph of a hypothetical system.
Figure 7B:
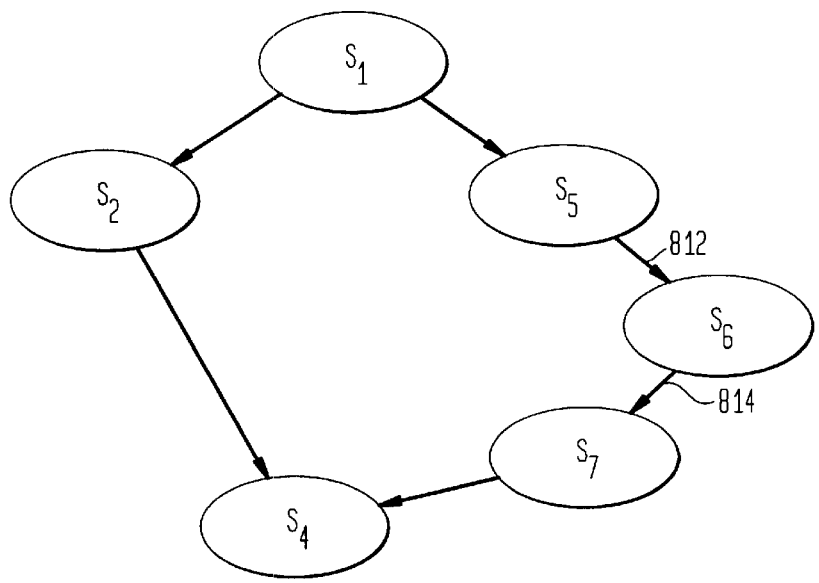
FIG. 7B illustrates a flattened graph of the hypothetical system of FIG. 7B.

The hierarchical nature of directed graphs and the process of inlining to remove hierarchy are further demonstrated with reference to FIG. 7A and to FIG. 7B. The unflattened graph of FIG. 7A comprises four nodes S(1–4), where nodes S1, S2 and S4 define MSC fragments, and S3 defines another directed graph. Because S3 does not define a MSC, the directed graph of FIG. 7A may be inlined or flattened to remove its hierarchical structure. An inlined graph incorporates the nested subgraph wherever a node references the subgraph by replacing the referring nodes with the contents of the subgraph. As can be seen from the flattened graph of FIG. 7B, S3 comprises nodes S(5–7), which define MSCs, and the edges 812, 814 connecting the nodes. A path through the graph of FIG. 7B defined by nodes S1, S3 and S4 corresponds to the basic MSCs defined in nodes S1, S5, S6, S7 and S4. A further discussion of MSCs, directed graphs and related requirements engineering concepts is found in Holzmann, Peled and Redberg, "Design Tools for Requirements Engineering," *Bell Labs Technical Journal*, Winter 1997 at 86–95, which is incorporated herein by reference.

To derive a test harness from the test cases, each MSC fragment in the selected paths are automatically concatenated to form an extended MSC for the corresponding scenario. The test case, which is a list of the edges comprising the scenario in sequential order, can be stored as a file and assigned a name. Using a test harness generator, the invention designates each object or process in the extended MSC as within the system to be tested or external to the system to be tested (that is, within the test harness). The generator, which is responsive to the extended MSC, constructs a list of the process names in the MSC of interest and presents the user with the names. The user then selects those processes to be tested and those within the test harness. Those processes contained within designated processes are assigned the same designation. Alternatively, the generator may be given the name of all processes prior to importing an extended MSC, and the user may make designations prior to importing the MSC.

Each extended MSC (test case) is evaluated based upon the message interchanges in the MSC and finite state machines are automatically generated for each object or process in the test harness. As is known in the art, these finite state machines exhibit sufficient behavior to stimulate the test system and to react to responses from the test system. For details regarding the automatic generation of test harness objects from MSC specifications, refer to S. Leue and P. Ladkin, "Implementing and Verifying MS Specifications Using Promela/XSPIN," *DIMACS-Series in Discrete Mathematics and Theoretical Computer Science*, Vol. 32, The Spin Verification System, American Mathematical Society, 1996. Implementation, hardware, and environmental data (or other parameters of interest) may be added to the test case to construct a test script operable to drive a simulation.

A regression test case set is a set of test cases that are used by the user to verify functionality in view of modifications or additions to the system. These modifications may be recorded in the requirements document and in the behavioral-requirements model. When the directed graph is changed to reflect the modifications, existing paths through the graph may be broken or new paths may be created. In order to ensure test coverage, a user may choose to fix broken test scenarios (paths through the graph) or generate a new set of cases.

Maintaining Regression Test Case Sets

During the life cycle of a system, new features are added and existing features are modified or retired. The user has to ensure that modified or new features work and that the presumably untouched functionality still works in the presence of modified, new or removed functionality. The invention can generate an optimal regression test case set at any time and in response to even the smallest changes in the model. A change to a model may be the addition or deletion of nodes or edges. A change may be small or large in scope. Changes, even minor ones, may alter the contents of the optimal set of test cases (that is, the regression test case set, or the set that achieves coverage of nodes and edges or of requirements) dramatically. After a change is made to a model, a new regression test set is generated automatically. This set covers all nodes and edges in the model and contains the minimum number of test cases and of the shortest length. This capability is of great practical value to the test engineer in that it vastly decreases the number of test cases that must be added to the test set in order to perform regression testing; that is, to provide complete testing coverage of both the new and preexisting portions of the implementation.

The present invention maintains a regression test case set that reflects all features by automatically detecting preexisting test cases that are broken by modifications made to the model and by permitting the user to correct the detected failures. For example, when new nodes are added or deleted with respect to an existing directed graph, the scenario that corresponds to a specific test case may be broken, if a previously existing edge or node was replaced by a node or edge, respectively, or was simply deleted.

Given a modified system, the invention permits the user to select specific test cases in the regression test case set to determine what affect, if any, the additional or new features have on the remaining functionality. For example, the invention permits the user to select all test cases that pass through a specified node or set of nodes. Once selected, the invention compares the corresponding scenario against the flattened directed graph of the modified system using standard comparison techniques. If any node (along with its associated edges) or edges that were present in the selected test case are no longer present, a graphical presentation of the broken test case is rendered showing where the failure occurred. For example, the graphical display may show nodes with no edges—called "hanging nodes." The user can then use the graphical user interface ("GUI") to connect the hanging nodes to other nodes via edges. Also, the MSC and Behavioral-requirements model editors mentioned above would be used in conjunction with the GUI to repair failed test cases. The interface could also be used to insert nodes that are missing for example, between two nodes. The resulting or new regression test case set, therefore, correctly reflects all changes in the modified system.

Figure 8:
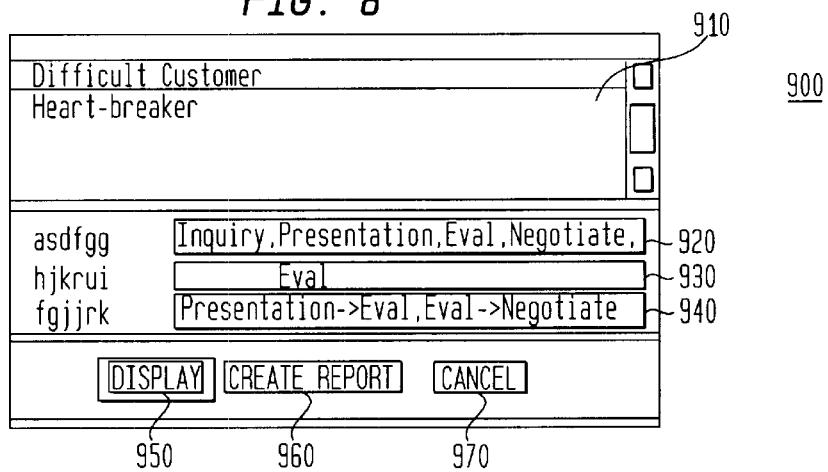
FIG. 8 illustrates an exemplary display showing broken scenarios with the missing nodes and edges.

Referring to FIG. 8, there is shown an interactive textual display 900 for effecting repair of broken scenarios. Display 900 includes a broken scenario display area 910, a scenario list box 920, a missing nodes box 930, and a missing edges box 940. Display area 900 also includes three interactive buttons, namely, a display button 950, a create report button 960 and a cancel button 970.

Operationally, a user selects one of the broken scenarios in broken scenario display area 910 by highlighting either the "Difficult Customer" or "Heart-breaker" scenarios. For the selected scenario, missing nodes box 930 and missing edges box 940 display the missing nodes and edges, respectively. For example, "Eval" is listed as a missing node along with its former connections, an edge eminating from "Presentation," and an edge ending to "Negotiate," as shown in missing edges box 940. If the user selects display 950, a graphical presentation of the broken scenario is shown. As stated, the user can then connect "hanging nodes" to reconstruct the broken scenario. Warnings, in the form of audio or additional text boxes, are given when repairs are undertaken by the user that will affect other scenarios.

The invention is also operable to suggest potential repair paths between any two nodes in the model. For two nodes, A and B, where A is a predecessor node to B, a depth-first search is performed from A to determine all nodes reachable from A. A backward depth-first search is performed from B to identify all nodes reachable from B. The intersection is taken from these two sets. The intersection defines all nodes reachable from A from which B can also be reached. A breadth-first search is performed from A on the intersection set previously defined. The search stops at the first generation of nodes that includes B. The number of generations is the length of the shortest path from A to B. All paths of this length from A to B in the breadth-first search tree are reported as a repair path. Node B is then deleted from the search tree resulting from the first generation which included node B. The breadth-first search is continued from this search tree forward, until B again appears. The number of generations constitutes the length of the shortest path in this section of the search. All paths from A to B of this length are reported. This process continues until enough potential repair paths are reported. If the depth-first search and backward depth-first search have no intersection, no potential repair paths are reported. Depth-first searches and breadth-first searches are disclosed in T. H. Cormen, Leiserson, C. E., Rivest, R. L., *Introduction to Algorithms*, MIT Press, 1990 at 469 and 477, which is incorporated herein by reference.

In another embodiment, the invention permits the user to apply a hybrid approach of repairing a subset or some of the test cases and then automatically regenerating any remaining test cases. This is achieved by pruning the directed graph to delete nodes and edges representing the repaired test cases and applying the selection techniques on the remaining directed graph. Alternatively, requirements coverage can be achieved, instead of node and edge coverage, to determine failures by using a variation of the pruning method discussed above. Other criteria can be used for pruning the requirements model. If labels or keywording is applied to nodes and edges, it is possible to prune the requirements model to include or exclude portions of the requirements model that exhibit a specified label or keyword or set of labels or keywords. By this means, it is possible to do targeted testing for specific features, feature interactions, and "Release" specific testing.

As detailed above, the invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

As shown, the invention generates regression test cases to test the requirements of a system feature. The regression test cases are automatically regenerated or are maintained over the life cycle of the system by automatically detecting test case failure or breakage and by providing means for allowing the user to specify how the test case failure is to be corrected. A hybrid approach of retaining some test cases and regenerating the remainder is also supported.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. An apparatus for maintaining regression test case sets from requirements, a requirement being a distinct and bounded property that a component must fulfill, comprising:

a representation of a distinct and bounded feature of a system from which a plurality of requirement relationships can be determined, said requirement relationships specifying a circumstance under which a requirement applies in a context of other requirements;

test case means responsive to the representation for automatically generating at least one regression test case set; and, test case maintenance means, responsive to adjusted distinct and bounded features of said system, for automatically providing an adjusted regression test case set.

2. The apparatus of claim 1, wherein said test case maintenance means automatically determines failures in said regression test case set in view of said adjusted distinct and bounded features.

3. The apparatus of claim 1, wherein said test case maintenance means includes:

detection means for automatically determining test case failure in said at least one regression test case set with regard to all distinct and bounded features of said system;

display means for graphically illustrating where test case failures exist; and interface means for specifying how a test case failure is to be corrected.

4. The apparatus of claim 3, wherein said detection means detects when repairs to failed test cases affect other test cases and provides a warning to a user when said affect is detected.

5. The apparatus of claim 3, wherein said test case maintenance means permits a user to select some failed test cases in said at least one regression test case set and automatically repair remaining failed test cases.

6. The apparatus of claim 1, wherein said test case means uniquely identifies each test case in said at least one regression test case set and said adjusted regression test case set.

7. The apparatus of claim 1, wherein said test case maintenance means permits a user to select all test cases in said at least one regression test case set that pass through at least one specified node.

8. The apparatus of claim 1, wherein said representation represents a directed graph.

9. The apparatus of claim 8, wherein said test case means further includes:

means responsive to said representation for solving a minimum costs, maximum flow problem for said directed graph;

means responsive to said solution for constructing a Euler path from said solution; and, means for converting said Euler path into paths through said directed graph.

10. The apparatus of claim 8, wherein said directed graph representation comprises nodes and edges, wherein said nodes reference one selected from the group comprising of message sequence charts, sub-behavioral-requirements models, empty sets and subgraphs.

11. The apparatus of claim 10, wherein said test case means uniquely identifies each test case in said regression test case set and said each test case is a list of edges in sequence.

12. The apparatus of claim 1, further including an editing apparatus for generating said representation, wherein said representation is a set of nodes and edges, each edge representing a link between at least two nodes, the representation being accessible to a computer system, the editing apparatus comprising:

a graphical system that is responsive to inputs including inputs from an input device for controlling a display and which provides outputs indicating a state of said display; and an editor means responsive to the representation and to the state outputs and operating in response to the representation to provide inputs to the graphical system which cause the graphical system to display the representation and in response to state outputs indicating modification of the displayed representation correspondingly modify the representation.

13. The apparatus of claim 12, further including detection means for automatically determining test case failure in said at least one regression test case set with regard to said distinct and bounded features of said system, wherein said test case maintenance means operates in conjunction with said editing apparatus to specify how test cases in said regression test set that fail with regard to said distinct and bounded features are resolved.

14. The apparatus of claim 1, wherein said test maintenance means further includes:

comparison means for comparing a new representation of said adjusted distinct and bounded features with said adjusted regression test case set; and display means for graphically illustrating test case failures.

15. The apparatus of claim 14, wherein said test case maintenance means further includes interface means for correcting a failure in a graphically illustrated test case.

16. A method implemented in a computer system for maintaining regression test case sets from requirements, a requirement being a distinct and bounded property that a component must fulfill, the method comprising the steps of:

generating from the requirements a representation of a system from which a plurality of requirement relationships can be determined, said requirement relationships specifying a circumstance under which a requirement applies in a context of other requirements;

generating automatically at least one regression test case set responsive to said representation; and, maintaining said regression test case set in response to adjusted distinct and bounded features of said system by automatically providing an adjusted regression test case set.

17. The method of claim 16, wherein said step of maintaining includes the step of automatically determining failures in said at least one regression test case set in view of said adjusted distinct and bounded features.

18. The method of claim 16, wherein said step of maintaining includes the steps of:

automatically detecting test case failures in said at least one regression test case set with regard to said distinct and bounded features of said system;

graphically displaying where test case failures exist; and, correcting a test case failure using a user interface.

19. The method of claim 18, wherein said correcting step provides a repair to a failed test case, the method including the further step of warning a user when said repair to said failed test case affects other test cases.

20. The method of claim 16, wherein said step of generating at least one regression test case set uniquely identifies each test case in said regression test case.

21. The method of claim 16, wherein said representation represents a directed graph.

22. The method of claim 16, wherein said step of generating said at least one regression test case set uniquely identifies each test case in said at least one regression test case and said each test case is a list of edges in sequence.

23. The method of claim 16, wherein said step of maintaining includes the steps of:

generating a new representation of said system in view of said adjusted distinct and bounded features;

comparing said new representation of said adjusted distinct and bounded features with a representation of said at least one regression test case set; and displaying test case failures.

24. The method of claim 16, wherein said step of generating from the requirements includes the steps of:

constructing a plurality of message sequence chart fragments from said requirements;

assigning an identifier to each said message sequence chart fragment;

constructing a directed graph, said directed graph comprising nodes and edges; and, assigning a node identifier to each said node, each said node identifier corresponding to one of said identifiers assigned to said message sequence chart fragments.

25. The method of claim 16, wherein said step of maintaining further includes the steps of:

manually repairing at least one failed test case in said at least one regression test case set; and automatically repairing remaining failed test cases in said at least one regression test case set.

26. A machine-readable medium having stored thereon a plurality of instructions, the plurality of instructions including instructions that, when executed by a machine, cause the machine to perform a test case maintenance method of generating a representation of a distinct and bounded feature of a system from which a plurality of requirement relationships can be determined, said requirement relationships specifying a circumstance under which a requirement applies in a context of other requirements, generating automatically at least one regression test case set responsive to said representation, and, maintaining said regression test case set in response to adjusted distinct and bounded features of said system by automatically providing an adjusted regression test case set.

27. The machine readable medium of claim 26 wherein said representation comprises a directed graph, said directed graph including a plurality of nodes, at least one of said nodes referencing a message sequence chart, and a plurality of edges connecting said nodes.

28. The machine readable medium of claim 27 wherein said regression test case set and said adjusted test case set include a sequence of said plurality of edges.

29. The machine readable medium of claim 26, the plurality of instructions including instructions that, when executed by the machine, cause the machine to detect a broken path through said directed graph.

* * * * *